(12) United States Patent
Striegel

(10) Patent No.: US 8,011,468 B2
(45) Date of Patent: Sep. 6, 2011

(54) MACHINE AND PNEUMATIC SEAT ASSEMBLY HAVING AIR CONTAINER WITH INTEGRAL AIR COMPRESSOR HOUSING

(75) Inventor: Alexander Striegel, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 447 days.

(21) Appl. No.: 12/221,502

(22) Filed: Aug. 4, 2008

(65) Prior Publication Data
US 2010/0026067 A1 Feb. 4, 2010

(51) Int. Cl.
*B62D 33/06* (2006.01)
*F16M 13/00* (2006.01)

(52) U.S. Cl. ............... 180/89.12; 248/562; 297/DIG. 8

(58) Field of Classification Search .............. 267/131, 267/133, 136, 140.11, 118, 122; 296/65.02; 180/89.12; 297/216.17, DIG. 8, DIG. 3, 297/217.7, 452.41; 248/562, 564, 588, 636, 248/664
See application file for complete search history.

(56) References Cited

U.S. PATENT DOCUMENTS

| | | | |
|---|---|---|---|
| 2,916,081 A * | 12/1959 | Pinkel ................ | 297/216.19 |
| 3,989,232 A * | 11/1976 | Steinbach et al. ...... | 267/117 |
| 4,198,025 A * | 4/1980 | Lowe et al. .......... | 248/550 |
| 4,629,253 A | 12/1986 | Williams | |
| 5,004,206 A * | 4/1991 | Anderson ............ | 248/585 |
| 5,234,203 A * | 8/1993 | Smith ................ | 267/131 |
| 5,529,377 A | 6/1996 | Miller | |
| 5,564,520 A * | 10/1996 | Forsythe ............. | 180/282 |
| 5,975,629 A | 11/1999 | Lorbiecki | |
| 6,202,972 B1 * | 3/2001 | Manavi .............. | 248/421 |
| 6,250,435 B1 * | 6/2001 | Dellmann et al. ...... | 188/71.8 |
| 6,481,520 B2 * | 11/2002 | McIlwain et al. ...... | 180/89.12 |
| 7,246,836 B2 * | 7/2007 | Hahn ................ | 296/65.02 |
| 7,568,675 B2 * | 8/2009 | Catton ............... | 248/588 |

OTHER PUBLICATIONS http://www.airsprings.com.au/Airide_Definitions.cfm, pp. 1-2, published prior to May 7, 2008.

* cited by examiner

*Primary Examiner* — Milton Nelson, Jr.
(74) *Attorney, Agent, or Firm* — Liell & McNeil

(57) ABSTRACT

A machine includes a machine body having an operator station and a seat assembly position at the operator station. The seat assembly includes a pneumatic support element that includes an air container having an air compressor positioned therein. The air container includes a deformable section, and a rigid section that includes a housing for the air compressor. Forming the air compressor housing integrally with the air container minimizes leak paths and improves packaging.

20 Claims, 2 Drawing Sheets

MACHINE AND PNEUMATIC SEAT ASSEMBLY HAVING AIR CONTAINER WITH INTEGRAL AIR COMPRESSOR HOUSING

TECHNICAL FIELD

The present disclosure relates generally to seat suspension systems used in mobile machines, and relates more particularly to a pneumatic seat assembly having an air container with an integral air compressor housing.

BACKGROUND

Certain types of machines are used in operating environments where shocks and vibrations of significant magnitude can occur frequently or continuously. Agricultural machines, forestry and mining machines and other off-highway machines such as loaders, backhoes, scrapers, track-type tractors, trucks, etc., are commonly used to travel across and interact with highly irregular substrates, and for tasks which can jar and/or vibrate the machine. Operators can be expected to work fairly long hours under such conditions, sometimes leading to premature operator fatigue and reduced operator comfort resulting from shocks and vibrations. In recent years, increased attention has been given to relatively subtle features of machine design and equipment that can help improve operator comfort and ameliorate fatigue. The layout, features and equipment at the operator station of many modern machines have seen much improvement in this regard over conventional strategies.

One area of particular interest relates to operator seating. In a wheel loader, tractor, off-highway truck and other machines, the operator typically sits in a seat within a cab where he/she has access to various machine controls. It is common for operator cabs to be mounted on resilient bumpers or the like which can dampen certain vibrations and reduce shocks between the machine body and the operator cab. Specialized seat mounting arrangements and pneumatic seat supports or "air bags" have also become common features in newer designs. There is no question that operator comfort, fatigue levels and even productivity have benefited from the adoption of improved seating technologies, however, these improvements have not come without drawbacks.

One type of seat intended to improve the foregoing concerns includes an inflatable air bag positioned between a machine seat and a machine body. An air compressor for the air bag is typically mounted either to the seat or to components of the seat assembly. An air line extends from the air compressor and connects to the air bag for supplying compressed air for inflating/pressurizing the air bag when the air compressor is activated. The air compressor housing includes an inlet and an air outlet to the air line. The air line connection to the air bag and the outlet to the air line from the air compressor housing are potential air leak paths. During operating the associated machine, the seat and air bag tend to move up and down as shocks and vibrations are experienced, potentially resulting in wear on the air line and its associated connections. Over time, leaks can develop which necessitate servicing the system or replacing components altogether. A further problem with conventional designs relates to the generally irregular shape and size of the air compressor housing, and the associated challenges to packaging the air compressor within the operator station, where space can be at a premium.

SUMMARY

In one aspect, a machine includes a machine body having an operator station and a plurality of ground-engaging elements coupled with the machine body. The machine further includes a seat assembly positioned at the operator station, the seat assembly including a vertically movable seat defining a vertical axis and a pneumatic support element positioned in a vertical load damping orientation between the seat and the machine body. The pneumatic support element includes an air container and an air compressor positioned within the air container. The air container has a deformable section and a rigid section mated to the deformable section which includes a compressor housing for the air compressor and defines an ambient air inlet for pressurizing the air container via the air compressor.

In another aspect, a pneumatic support element for a seat assembly of a machine includes an air container having a first end, a second end and a length extending from the first end to the second end, the air container being configured to dampen vertical loads between a seat of the seat assembly and a machine body of the machine at least in part by changing length in response to a load on the seat or the machine body. The air container further includes a deformable section and a rigid section mated to the deformable section. The pneumatic support element further includes an air compressor positioned within the air container, wherein the rigid section includes a compressor housing for the air compressor and defines an ambient air inlet fluidly connecting with the air compressor for pressurizing the air container.

In still another aspect, a method of varying air pressure in a pneumatic support element of a seat assembly includes a step of activating an air compressor located within an air container of a pneumatic support element positioned in a vertical load damping orientation between a seat and machine body. The method further includes a step of increasing air pressure within the air container in response to the step of activating at least in part by drawing air into the air container with the air compressor via an ambient air inlet defined by a rigid section of the air container which includes a compressor housing for the air compressor. The method still further includes a step of containing the air pressure within the air container via the rigid section and via a deformable section of the air container mated to the rigid section.

DETAILED DESCRIPTION

Figure 1:
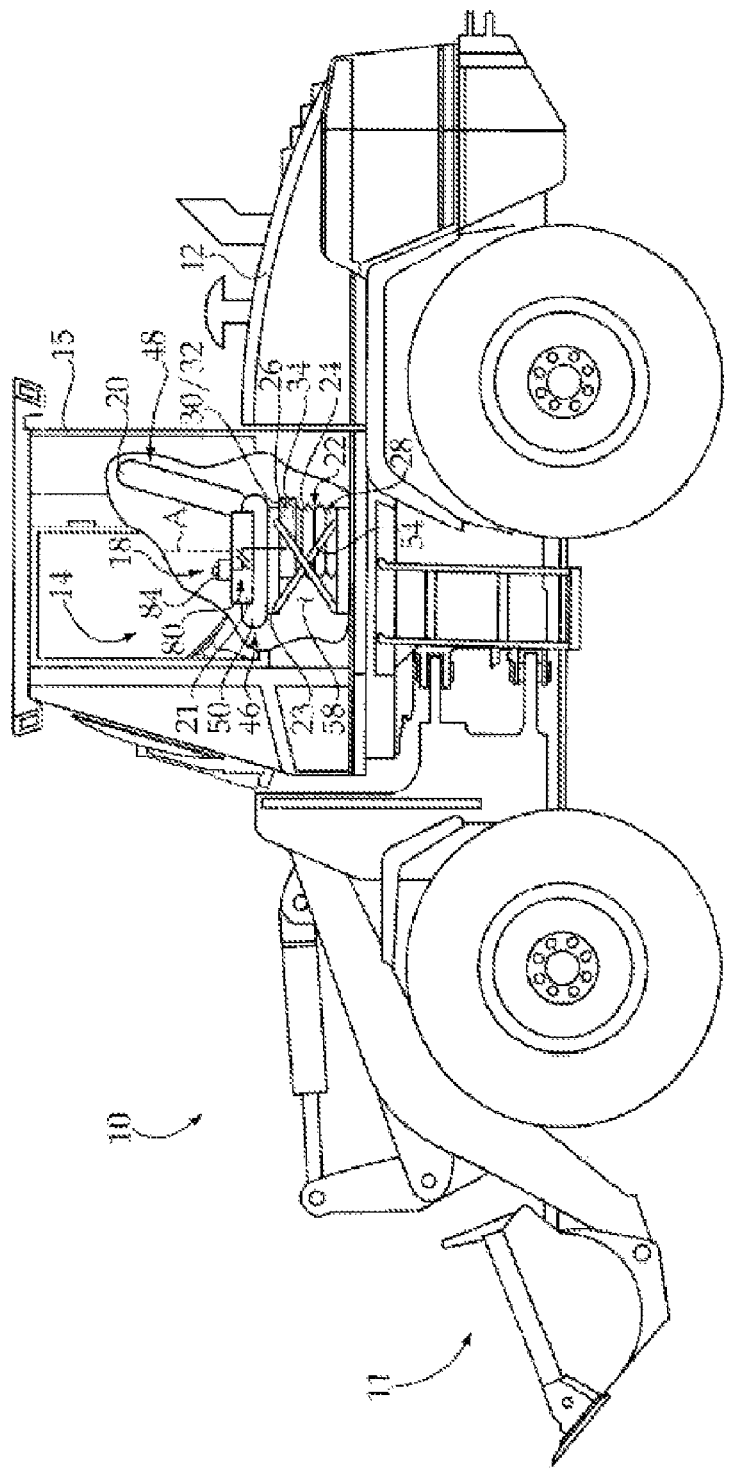
FIG. 1 is a side diagrammatic view of a machine according to one embodiment.

Referring to FIG. 1, there is shown a machine 10 according to one embodiment. Machine 10 is shown in the context of a wheel loader having a machine body 12 which includes an operator station 14 located within a cab 15. An implement system 11 is shown coupled with machine body 12, and a seat assembly 18 is shown positioned at operator station 14 such that an operator can control machine activities such as the use of implement system 11, machine travel direction, etc., while seated on seat assembly 18 in a conventional manner. It should be appreciated that the particular type of machine shown in FIG. 1 is exemplary only, and in other embodiments a different machine type such as a motor grader, an off-highway truck, a track-type tractor, or a wide variety of other machines may fairly be said to fall within the scope of the present disclosure. It should further be understood that the present disclosure is not limited to seat assemblies and machines for off-highway applications, and on-highway machines and seat assemblies are also contemplated herein. As will be further apparent from the following description, seat assembly 18 may be configured to pneumatically dampen loads between a seat 20 of seat assembly 18 and machine body 12, providing for improved operator comfort and reduced fatigue, yet having a robust design including components uniquely adapted to require reduced packaging space.

Seat assembly 18 may include seat 20 which is mounted on a seat frame 23 which is vertically movable to dampen shocks, loads, vibrations, etc., imparted to or passing between seat 20 and machine body 12. To this end, seat assembly 18 may further include a pneumatic support element 22 positioned in a vertical load damping orientation between seat 20 and machine body 12. As used herein, the term "vertical" should be understood in general reference to a vertical axis "A" defined by seat 20. So long as pneumatic support element 22 is capable of damping loads having a vertical component, pneumatic support element 22 may fairly be said to be in a vertical load damping orientation. Thus, pneumatic support element 22 could be positioned diagonally relative to vertical axis A, and the particular configuration selected will depend on factors such as the overall design of machine 10 and its intended operating environment. In one practical implementation strategy, pneumatic support element 22 may be positioned such that it changes length in a direction parallel vertical axis A. Pneumatic support element 22 may also include an air container 24 and an air compressor 26 positioned within air container 24. Air container 24 may include a deformable section 28 and a rigid section 30 mated to deformable section 28, for example clamped thereto. Rigid section 30 includes a compressor housing 32 for air compressor 26, and further defines an ambient air inlet 34 for pressurizing air container 24 via air compressor 26.

Figure 2:
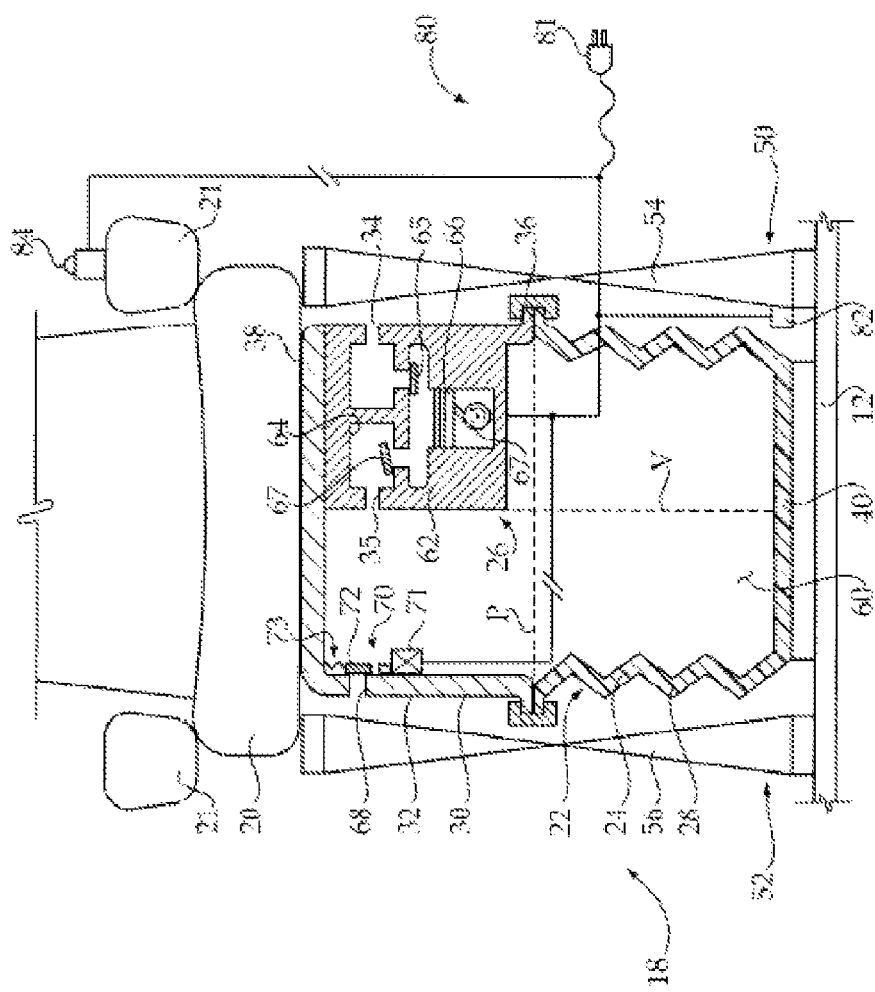
FIG. 2 is a partially sectioned side diagrammatic view of a seat assembly according to one embodiment.

Referring now also to FIG. 2, in one embodiment rigid section 30 may include a first longitudinal segment of air container 24 and deformable section 28 may include a second longitudinal segment of air container 24. Rigid section 30 and deformable section 28 may also be understood to comprise first and second vertical segments, respectively, in reference to vertical axis A. Rigid section 30 and deformable section 28 may be mated at an interface 36 defining a plane "P" which is oriented transverse to a longitudinal axis "V" of air container 24. In one embodiment, longitudinal axis V may be oriented parallel vertical axis A, and plane P may be oriented normal to longitudinal axis V and also oriented normal to vertical axis A. As alluded to above, air container 24 may be configured to change length in response to vertical loads on seat 20. Changing the length of air container 24 may be enabled by deforming deformable section 28. In one practical implementation strategy, rigid section 30 may include a material having a first rigidity and deformable section 28 may include a second, different material having a second rigidity which is less than the first rigidity. Rigid section 30 might be formed from plastic or the like, whereas deformable section 28 might be formed from rubber. In other embodiments, rigid section 30 and deformable section 28 might be formed from the same or similar materials, but have different shapes, configurations, etc., to allow deformable section 28 to be deformed relative to rigid section 30. Air container 24 may further include a first end 38 and a second end 40. Rigid section 30 may include a first length, parallel axis V, extending between interface 36 and end 38, whereas deformable section 28 may include a second, relatively greater length extending between interface 36 and second end 40. Since deformable section 28 can change shape, e.g. by extending its length, it might of course be possible to squash deformable section 28 down to have a length less than the length of rigid section 30. As used herein, the term "length" should be understood to refer to the relative lengths of deformable section 30 and rigid section 28 when deformable section 30 is expanded to at least 75%, for example, of its maximum length. In other embodiments, deformable section 28 and rigid section 30 could have equal lengths, or the length of rigid section 28 could be longer than that of deformable section 30. Each of rigid section 30 and deformable section 28 may be similarly shaped in one embodiment, albeit deformable section 28 may be corrugated and rigid section 30 may be non-corrugated. In one further embodiment, each of rigid section 30 and deformable section 28 may define a cylindrical shape, such that interface 36 is a substantially circular interface. Each of rigid section 30 and deformable section 28 might also define a rectangular solid shape, such that interface 36 is a substantially square interface in one embodiment. In still other embodiments, the respective sections 28, 30 might have different shapes, however, a portion of rigid section 30 terminating at a first side of interface 36 will typically define a shape symmetric with a shape defined by a portion of deformable section 28 terminating at an opposite side of interface 36 in a practical implementation strategy. Thus, it should be appreciated that the respective sections 28, 30 may have a variety of shapes and sizes, and may be shaped differently from one another, but will typically include portions abutting and mated at interface 36 which define similar shapes for ease of packaging and ease of forming a fluid seal therebetween.

Seat assembly 18 may further include a front side 46, a back side 48, a first lateral side 50 and a second lateral side 52. A first scissors assembly 54 may be disposed at first lateral side 50 whereas a second scissors assembly 56 may be disposed at second lateral side 52. Scissors assemblies 54 and 56 may be configured to guide seat 20 during vertically moving seat 20. Seat assembly 18 may further define an under seat space 58 extending between front side 46 and back side 48, and also extending between first lateral side 50 and second lateral side 52. Pneumatic support element 22 may be positioned within under seat space 58.

As discussed above, many earlier pneumatically supported seat assemblies suffered from packaging constraints, as well as being prone to air leaks. These and other concerns are addressed in the present disclosure by forming rigid section 30 to include an air compressor housing 32 for air compressor 26. Thus, in at least certain embodiments housing 32 and rigid section 30 may be the same part. Air compressor 26 may further include a compressor body 62 defining an intake pathway 64 fluidly connecting ambient air inlet 34 via a compressor outlet 35 with a pressure space 60 defined in part by rigid section 30 and in part by deformable section 28. In one embodiment, compressor body 62 may be mounted to compressor housing 32. Fasteners, for example, (not shown) might be used to mount compressor body 62 to compressor housing 32. A wide variety of different compressor designs might be used, however, a practical implementation strategy is contemplated to be use of a single piston design, wherein a piston 66 disposed within compressor body 62 is coupled with a rotatable element 67, which may be electrically driven. Air compressor 26 may also include an inlet valve 65 and an outlet valve 67 which function in cooperation with a reciprocation of piston 66 in a conventional manner.

In one embodiment, rigid section 30 may also define a compressed air outlet 68. Pneumatic support element 24 may further include a bleed valve 70 having a first bleed valve state at which compressed air outlet 68 is fluidly connected with pressure space 60, and a second bleed valve state at which bleed valve 70 blocks compressed air outlet 68 from pressure space 60. In one design, bleed valve 70 may include an electrical actuator 71, a valve member 72 and a biasing member 73. Changing an electrical energy state of electrical actuator 71 can move valve member 72 between two different positions corresponding to the two different bleed valve states mentioned above. Biasing member 73 can bias valve member 72 toward a position at which compressed air outlet 68 is blocked from pressure space 60.

Seat assembly 18 may still further include an electrical system 80, including an electrical connector 81, a switch 84, and an activator 82. Electrical system 80 may provide electrical power to air compressor 26, to bleed valve 70, to activator 82 and to switch 84 as needed. In one embodiment, activator 82 may be coupled with seat assembly 18 and configured to sense a vertical load on seat 20 and responsively activate air compressor 26. Switch 84, which may be mounted on an armrest 21 of seat assembly 18, or positioned elsewhere, may be configured to switch bleed valve 70 between its respective states. Switch 84, or other switches (not shown), could also be used for other purposes such as manually activating or deactivating air compressor 26.

INDUSTRIAL APPLICABILITY

When an operator sits down on seat 20, his or her weight will provide a vertical load on seat assembly 18. In one embodiment, activator 82 might include a pressure sensor, a weight sensor or a motion sensor, all of which are known in various forms in the art. Activator 82 could be coupled with scissors assembly 54, for example, and could sense a vertical load or motion of scissors assembly 54 when an operator sits on seat 20, resulting in downward movement of seat 20 toward machine body 12. In response to the vertical movement of seat 20, activator 82 can output a signal, voltage change, etc., to air compressor 26 to activate air compressor 26.

Activation of air compressor 26 may include rotating element 67 and responsively reciprocating piston 66 upward and downward in compressor body 62. Downward movement of piston 66 may correspond with an intake stroke, drawing air into intake pathway 64 via inlet 34. Air passing into intake pathway 64 in response to downward movement of piston 66 can urge inlet valve 65 open, while outlet valve 67 is urged closed. When piston 66 reverses direction, inlet valve 65 may be urged closed and outlet valve 67 may be pushed open such that piston 66 can push air into pressure space 60 via outlet 35. In FIG. 2, piston 66 is shown approximately as it might appear having just completed an upward, pressurization stroke, and just prior to beginning a downward intake stroke. Air pressure in pressure space 60 will tend to be higher than ambient air pressure and, hence, the pressure of air within air container 24 will tend to hold inlet valve 65 closed when piston 66 is not operating, tending to maintain air container 24 at an elevated pressure. Continued reciprocation of piston 66 will thus tend to increase pressure within air container 24, typically deforming deformable section 28, increasing air pressure within air container 24 and increasing a length of air container 24 in a direction parallel axis V. Stated another way, increasing air pressure within pressure space 60 can lengthen air container 24 in opposition to the vertical load on seat 20 that corresponds with the operator's weight.

In one embodiment, seat assembly 18 may include a feedback mechanism (not shown) that senses when air pressure in air container 24 has been increased to an operating air pressure, and responsively shuts off air compressor 26. As mentioned above, switch 84 may include a bleed valve control switch which can be actuated to switch bleed valve 70 between its respective states, enabling an operator to selectively bleed air pressure from pressure space 60 to ambient via compressed air outlet 68. Electrical system 80 might also include a manual control switch (not shown) for air compressor 26 instead of or in addition to activator 82 which allows an operator to manually activate air compressor 26 to pressurize air container 24 as desired. In use, air container 24 can change length in a direction parallel axis V and absorb shocks, vibrations, etc. which are encountered during operation of machine 10.

As discussed above, many earlier pneumatic seat systems suffered from various drawbacks, such as multiple potential leak paths. In the present disclosure, pneumatic support element 22 eliminates potential leak paths by integrating compressor housing 32 with air container 24. Moreover, the potential for wear-related leakage, etc., such as air line failure, is essentially eliminated since components of air compressor 26 are not subjected to potential wear from moving seat assembly 18 during operation. No air line is necessary, lessening the likelihood of an operator or equipment tangling, cutting or otherwise interfering with components of seat assembly 18. Further, air compressor 26 and air compressor housing 32 can be packaged within under seat space 58 such that the obtrusive air compressor components, lines, etc., of older designs are eliminated. In this vein, it should be appreciated that pneumatic support element 22 can be designed to occupy substantially the same space as that previously required for the air bag alone in conventional systems.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent from an examination of the attached drawings and appended claims.

What is claimed is:

1. A machine comprising:
   a machine body which includes an operator station;
   a plurality of ground engaging elements coupled with the machine body; and
   a seat assembly positioned at the operator station, the seat assembly including a vertically movable seat defining a vertical axis and a pneumatic support element positioned in a vertical load damping orientation between the seat and the machine body, the pneumatic support element including an air container and an air compressor positioned within the air container, the air container having a deformable section and a rigid section mated to the deformable section which includes a compressor housing for the air compressor and defines an ambient air inlet for pressurizing the air container via the air compressor.

2. The machine of claim 1 wherein the rigid section includes a first vertical segment of the air container and the deformable section includes a second vertical segment of the air container, and wherein the rigid section and the deformable section are mated at an interface defining a plane oriented transverse to the vertical axis.

3. The machine of claim 2 wherein the rigid section includes a first material having a first rigidity and the deformable section includes a second, different material having a second rigidity which is less than the first rigidity.

4. The machine of claim 3 wherein the air container includes a first end and a second end, wherein the rigid section includes a first length extending between the interface and the first end and the deformable section includes a second, relatively greater length extending between the interface and the second end.

5. The machine of claim 4 wherein a portion of the rigid section terminating at a first side of the interface defines a shape which is symmetric with a shape defined by a portion of the deformable section terminating at an opposite side of the interface.

6. The machine of claim 2 wherein the seat assembly includes a front side, a back side, a first lateral side and a second lateral side and a first scissors assembly disposed at the first lateral side and a second scissors assembly disposed at the second lateral side, the first and second scissors assemblies being configured to guide the seat during vertically moving the seat.

7. The machine of claim 6 wherein the seat assembly defines an under seat space extending between the front side and the back side and between the first lateral side and the second lateral side, the pneumatic support element being positioned within the under seat space.

8. The machine of claim 1 wherein the rigid section and the deformable section together define a pressure space, and wherein the air compressor includes a compressor body defining an intake pathway fluidly connecting the ambient air inlet with the pressure space and having a piston disposed within the compressor body.

9. The machine of claim 8 wherein the compressor body is mounted to the compressor housing.

10. The machine of claim 8 wherein the rigid section defines a compressed air outlet, the pneumatic support element further including a bleed valve having a first bleed valve state at which the compressed air outlet is fluidly connected with the pressure space and a second bleed valve state at which the bleed valve blocks the compressed air outlet from the pressure space.

11. The machine of claim 10 comprising a wheel loader which includes a cab wherein the operator station is located, the seat assembly further including an electrical system located within the cab and having an activator coupled with the seat assembly which is configured to sense a vertical load on the seat and responsively activate the air compressor, and a bleed control switch which is coupled with the bleed valve and configured to switch the bleed valve between the first bleed valve state and the second bleed valve state.

12. A pneumatic support element for a seat assembly of a machine comprising:
an air container positionable at an operator station of the machine in a vertical load damping orientation between a vertically movable seat of the seat assembly defining a vertical axis and a machine body of the machine, the air container including a deformable section and a rigid section mated to the deformable section; and
an air compressor positioned within the air container, wherein the rigid section includes a compressor housing for the air compressor and defines an ambient air inlet fluidly connecting with the air compressor for pressurizing the air container.

13. The pneumatic support element of claim 12 wherein the rigid section and the deformable section together define a pressure space, wherein the air compressor includes a compressor body defining an intake pathway fluidly connecting the ambient air inlet with the pressure space and mounted to the compressor housing, and wherein the air container further includes a first end, a second end and a length extending from the first end to the second end, and is configured to dampen vertical loads between the seat and the machine body at least in part by changing the length in response to a load on the seat or the machine body.

14. The pneumatic support element of claim 13 wherein the air compressor includes a piston.

15. The pneumatic support element of claim 14 wherein the rigid section includes a first material having a first rigidity and the deformable section includes a second, different material having a second rigidity which is less than the first rigidity.

16. The pneumatic support element of claim 15 wherein the air container defines a longitudinal axis, and wherein the rigid section includes a first longitudinal segment of the air container having a first length and the deformable section includes a second longitudinal segment of the air container having a second, relatively greater length, and wherein the rigid section and the deformable section are mated at an interface defining a plane oriented normal to the longitudinal axis.

17. The pneumatic support element of claim 12 wherein the rigid section and the deformable section together define a pressure space and the rigid section further defines a compressed air outlet, the pneumatic support element further including a bleed valve having a first bleed valve state at which the pressure space is fluidly connected with the compressed air outlet and a second bleed valve state at which the bleed valve blocks the pressure space from the compressed air outlet.

18. A method of varying air pressure in a pneumatic support element of a seat assembly comprising the steps of:
activating an air compressor located within an air container of a pneumatic support element located at an operator station of a machine and positioned in a vertical load damping orientation between a vertically movable seat defining a vertical axis and a machine body;
increasing air pressure within the air container in response to the step of activating at least in part by drawing air into the air container with the air compressor via an ambient air inlet defined by a rigid section of the air container which includes a compressor housing for the air compressor; and
containing the air pressure within the air container via the rigid section and via a deformable section of the air container mated to the rigid section.

19. The method of claim 18 wherein the step of activating includes a step of activating the air compressor in response to a vertical load on the seat, and wherein the step of increasing further includes a step of increasing the air pressure within the air container in opposition to the vertical load on the seat.

20. The method of claim 19 further comprising a step of reducing the air pressure within the air container at least in part by fluidly connecting a pressure space defined in part by the rigid section and in part by the deformable section with a compressed air outlet defined by the rigid section.

* * * * *